(12) United States Patent
Kuri

(10) Patent No.: US 10,175,108 B2
(45) Date of Patent: Jan. 8, 2019

(54) SPECTROSCOPIC MEASUREMENT APPARATUS, DRIVING CIRCUIT, AND SPECTROSCOPIC MEASUREMENT METHOD

(71) Applicant: Seiko Epson Corporation, Tokyo (JP)

(72) Inventor: Ryohei Kuri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/413,733

(22) Filed: Jan. 24, 2017

(65) Prior Publication Data

US 2017/0219432 A1 Aug. 3, 2017

(30) Foreign Application Priority Data

Feb. 2, 2016 (JP) ................. 2016-018307

(51) Int. Cl.
*G01J 3/26* (2006.01)
*G01J 3/02* (2006.01)

(52) U.S. Cl.
CPC ............... *G01J 3/26* (2013.01); *G01J 3/0275* (2013.01)

(58) Field of Classification Search
CPC .................... G01J 3/26; G01J 3/0275
See application file for complete search history.

(56) References Cited

U.S. PATENT DOCUMENTS

| | | | | |
|---|---|---|---|---|
| 4,113,385 A | * | 9/1978 | Ford ................. | G01D 3/00 333/172 |
| 8,848,196 B2 | | 9/2014 | Nishimura et al. | |
| 9,291,502 B2 | | 3/2016 | Nishimura | |
| 2005/0237416 A1 | * | 10/2005 | Hasegawa ............ | H04N 5/2254 348/335 |
| 2012/0120403 A1 | * | 5/2012 | Funamoto ............. | G01J 3/26 356/451 |
| 2012/0133947 A1 | * | 5/2012 | Nozawa ............... | G02B 26/001 356/450 |
| 2013/0070247 A1 | * | 3/2013 | Funamoto ............. | G01J 3/26 356/416 |
| 2013/0107262 A1 | * | 5/2013 | Nishimura ............ | G01J 3/42 356/416 |
| 2013/0188661 A1 | * | 7/2013 | Wilk .................... | H01S 3/10 372/25 |
| 2014/0009761 A1 | | 1/2014 | Nishimura | |

FOREIGN PATENT DOCUMENTS

| | | |
|---|---|---|
| JP | 2013-064640 A | 4/2013 |
| JP | 2014-013177 A | 1/2014 |
| JP | 5919728 B2 | 5/2016 |

* cited by examiner

*Primary Examiner* — Dominic J Bologna
(74) *Attorney, Agent, or Firm* — Harness, Dickey & Pierce, P.L.C.

(57) ABSTRACT

A spectroscopic measurement apparatus includes a wavelength variable interference filter and a driving circuit. The wavelength variable interference filter includes a fixed reflection film, a movable reflection film that faces the fixed reflection film, and an electrostatic actuator that changes a distance between the fixed reflection film and the movable reflection film. The driving circuit drives the electrostatic actuator in such a way that the distance between the fixed reflection film and the movable reflection film changes at a uniform velocity.

11 Claims, 8 Drawing Sheets

SPECTROSCOPIC MEASUREMENT APPARATUS, DRIVING CIRCUIT, AND SPECTROSCOPIC MEASUREMENT METHOD

BACKGROUND

1. Technical Field

The present invention relates to a spectroscopic measurement apparatus, a driving circuit, and a spectroscopic measurement method, etc.

2. Related Art

A spectroscopic measurement apparatus that includes a wavelength variable interference filter is known. For example, a spectroscopic measurement apparatus disclosed in JP-A-2013-092474 is provided with a wavelength variable interference filter that includes a pair of reflection films facing each other, wherein the distance between the pair of reflection films is changed in accordance with measurement wavelength. In the spectroscopic measurement apparatus disclosed in JP-A-2013-092474, an electrostatic actuator that changes a distance between the pair of reflection films is provided, and an analog voltage that changes in a continuous manner is applied to the electrostatic actuator. The voltage applied to the electrostatic actuator is monitored. When the monitored voltage becomes equal to a predetermined measurement voltage, transmitted light that has passed through the wavelength variable interference filter is detected by a detection unit.

In the apparatus disclosed in JP-A-2013-092474, the velocity at which the distance between the pair of reflection films changes (distance change velocity) varies in a sinusoidal wave pattern when the analog voltage is applied to the electrostatic actuator for cyclic driving. In this case, the gap change velocity is not constant when the light outputted from the wavelength variable interference filter is detected by the detection unit and, therefore, non-uniformity in measurement wavelength interval appears when the signal from the detection unit is acquired at a constant time interval. That is, the measurement wavelength interval is dense at a position of a low distance change velocity and is sparse at a position of a high distance change velocity. In JP-A-2013-092474, in which the voltage applied to the electrostatic actuator is monitored and the signal from the detection unit is acquired when the monitored voltage becomes equal to a predetermined measurement voltage, it is difficult to obtain the results of measurement for each measurement wavelength with a predetermined measurement wavelength interval just by performing scan once at a position of a high distance change velocity. In such a case, it is necessary to perform scan plural times and, therefore, it takes long to complete the measurement.

SUMMARY

An advantage of some aspects of the invention is to provide a spectroscopic measurement apparatus capable of obtaining the results of measurement with a constant measurement wavelength interval, a driving circuit, and a spectroscopic measurement method.

A spectroscopic measurement apparatus according to an application example of the invention comprises: a wavelength variable interference filter including a first reflection film, a second reflection film that faces the first reflection film, and an electrostatic actuator that changes a distance between the first reflection film and the second reflection film; and a driving control section that drives the electrostatic actuator in such a way that the distance between the first reflection film and the second reflection film changes at a uniform velocity. The term "uniform velocity" mentioned here encompasses velocity that is substantially uniform.

In this application example, the electrostatic actuator is driven by the driving control section in such a way that the distance between the first reflection film and the second reflection film changes at a uniform velocity. In this case, the wavelength of light outputted from the wavelength variable interference filter changes linearly in relation to elapsed time. Therefore, by performing spectroscopic measurement of detecting the output light in a constant cycle, it is possible to obtain the results of spectroscopic measurement with a constant measurement wavelength interval (with suppression of non-uniformity in measurement wavelength interval). Moreover, when scan processing for spectroscopic measurement is performed in a constant cycle while changing the distance between the first reflection film and the second reflection film (between-reflection-films distance) from a predetermined maximum value to a predetermined minimum value, it is possible to obtain the measurement results with suppression of non-uniformity in measurement wavelength interval just by performing scan processing once. It is not necessary to perform scan processing plural times and, therefore, it is possible to reduce the time taken for measurement.

Preferably, in the spectroscopic measurement apparatus according to the above application example, the driving control section should include a voltage output section that outputs a pulse voltage of a predetermined cycle and a low pass filter that outputs a driving voltage that corresponds to the pulse voltage for driving the electrostatic actuator. In general, in an electrostatic actuator, electrostatic attraction that is proportional to the square of a voltage applied between a pair of electrodes and is inversely proportional to the square of the distance between the electrodes acts. Therefore, when a pulse voltage that has a rectangular waveform for minimizing the between-reflection-films distance is inputted into the electrostatic actuator directly, the between-reflection-films distance changes steeply in an accelerated manner and, therefore, it is difficult to obtain the results of spectroscopic measurement with a constant measurement wavelength interval. In contrast, in this application example, a pulse voltage of a predetermined cycle outputted from the voltage output section is inputted into the low pass filter, and a driving voltage outputted from the low pass filter is inputted into the electrostatic actuator. That is, when a pulse voltage (rectangular waveform) is inputted into the low pass filter, the inputted pulse voltage is converted into a driving voltage that has a first-order-lag waveform corresponding to the time constant τ, and the driving signal is inputted into the electrostatic actuator. That is, in the initial state in which no voltage is applied to the electrostatic actuator and the value of the between-reflection-films distance is great, a voltage that is comparatively great in the inclination of a voltage value in relation to elapsed time (change percentage) is inputted. As the value of the between-reflection-films distance decreases, a voltage of a gentler slope is inputted into the electrostatic actuator. In this application example, the low pass filter is configured to make the distance change velocity of the between-reflection-films distance uniform or substantially uniform when the above-described driving voltage having the first-order-lag waveform is inputted and, therefore, with a simple structure, it is possible to change the between-reflection-films distance at a uniform velocity or at a substantially uniform velocity, thereby obtaining the results of spectroscopic measurement with a constant measurement wavelength interval speedily.

Preferably, in the spectroscopic measurement apparatus according to the above application example, a time constant of the low pass filter should be variable, and the low pass filter should include a time constant changing section that changes the time constant. In this application example, the time constant of the low pass filter is changed by the time constant changing section. If a low pass filter that has a fixed time constant is used, the waveform of an output voltage is also fixed. However, in some cases, the distance change velocity of the between-reflection-films distance could change due to, for example, a change in the installation environment or driving environment of the wavelength variable interference filter. In this respect, since the time constant changing section is capable of changing the time constant of the low pass filter in this application example, it is possible to change the between-reflection-films distance at a uniform velocity or at a substantially uniform velocity by changing the time constant of the low pass filter appropriately.

Preferably, the spectroscopic measurement apparatus according to the above application example should further comprise: a distance detection section that detects the distance between the first reflection film and the second reflection film, and the time constant changing section should change the time constant in such a way that a change in the distance detected by the distance detection section is uniform in velocity. In this application example, the between-reflection-films distance is detected by the distance detection section. The time constant changing section changes, therefore, the time constant on the basis of the detected distance. That is, it is possible to set, with high precision, a time constant that ensures that the between-reflection-films distance changes at a uniform velocity.

Preferably, the spectroscopic measurement apparatus according to the above application example should further comprise: a level changing section that changes a voltage level of the pulse voltage. In this application example, the voltage level of the pulse voltage is changed by the level changing section. By this means, it is possible to increase/decrease the voltage level (maximum value) of the driving voltage outputted from the low pass filter. By increasing/decreasing the voltage level of the driving voltage applied to the electrostatic actuator, it is possible to change the measurement wavelength region, with determination of the range of changing the between-reflection-films distance.

Preferably, the spectroscopic measurement apparatus according to the above application example should further comprise: a light receiving unit that receives light outputted from the wavelength variable interference filter, wherein a signal from the light receiving unit should be acquired in a constant cycle. In this application example, the signal outputted from the light receiving unit is acquired in a constant cycle. In this application example, as described above, the between-reflection-films distance changes at a uniform velocity or at a substantially uniform velocity. Therefore, by performing signal acquisition from the light receiving unit in a constant cycle, it is possible to acquire the signal for light of measurement wavelength with a constant measurement wavelength interval. Therefore, it is possible to obtain the results of spectroscopic measurement that are free from non-uniformity in measurement wavelength interval.

Preferably, in the spectroscopic measurement apparatus according to the above application example, the driving control section should include a voltage output section that outputs a pulse voltage of a predetermined cycle and a low pass filter that outputs a driving voltage that corresponds to the pulse voltage for driving the electrostatic actuator, a time constant of the low pass filter being variable, and the spectroscopic measurement apparatus according to the above application example should further comprise: a distance detection section that detects the distance between the first reflection film and the second reflection film; and a time constant changing section that changes the time constant in such a way that an amount of a change in the distance detected by the distance detection section is constant, wherein acquisition timing of the signal from the light receiving unit and detection timing of the distance by the distance detection section should be different from each other. In a case where the signal from the distance detection section (distance detection signal) and the signal from the light receiving unit (received signal) are acquired at the same time, it is necessary to process the two signals at the same time. In some cases, this makes the response time of each circuit and the time taken for AD conversion long, resulting in a wide measurement wavelength interval. In contrast, in this application example, the acquisition timing of the distance detection signal and the acquisition timing of the received signal are different from each other. Since it is unnecessary to process the two signals at the same time, it is possible to make the response time of each circuit and the time taken for AD conversion short, thereby reducing the cycle of acquisition of the received light signal and the detection signal. This makes it possible to reduce the measurement wavelength interval and obtain the results of spectroscopic measurement with high resolution.

A driving circuit according to an application example of the invention is a circuit that drives an electrostatic actuator of a wavelength variable interference filter, the wavelength variable interference filter including a first reflection film, a second reflection film that faces the first reflection film, and the electrostatic actuator that changes a distance between the first reflection film and the second reflection film, comprising: a voltage output section that outputs a pulse voltage of a predetermined cycle; and a low pass filter that outputs a driving voltage that corresponds to the pulse voltage for driving the electrostatic actuator, wherein the driving voltage is outputted in such a way that the distance between the first reflection film and the second reflection film changes at a uniform velocity.

In this application example, as in the foregoing application example, a pulse voltage of a predetermined cycle outputted from the voltage output section is inputted into the low pass filter, and a driving voltage outputted from the low pass filter is inputted into the electrostatic actuator. That is, it is possible to input, into the electrostatic actuator, a converted driving voltage of a first-order-lag waveform corresponding to the time constant $\tau$ of the low pass filter, thereby changing the between-reflection-films distance in the wavelength variable interference filter at a uniform velocity or at a substantially uniform velocity. Therefore, it is possible to obtain the results of spectroscopic measurement with a constant measurement wavelength interval by measuring the light outputted from the wavelength variable interference filter in a constant cycle.

A spectroscopic measurement method according to an application example of the invention is a method implemented by a spectroscopic measurement apparatus, the spectroscopic measurement apparatus including a wavelength variable interference filter and a light receiving unit, the wavelength variable interference filter including first reflection film, a second reflection film, and an electrostatic actuator, the second reflection film facing the first reflection film, the electrostatic actuator changing a distance between the first reflection film and the second reflection film, the light receiving unit receiving light outputted from the wavelength variable interference filter, comprising: driving the electrostatic actuator in such a way that a change in the distance between the first reflection film and the second reflection film is uniform in velocity; and acquiring a signal from the light receiving unit in a constant cycle. In this application example, as in the foregoing application example, the between-reflection-films distance changes at a uniform velocity or at a substantially uniform velocity. Therefore, by acquiring the signal from the light receiving unit in a constant cycle, it is possible to perform spectroscopic measurement for each measurement wavelength with a constant measurement wavelength interval.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
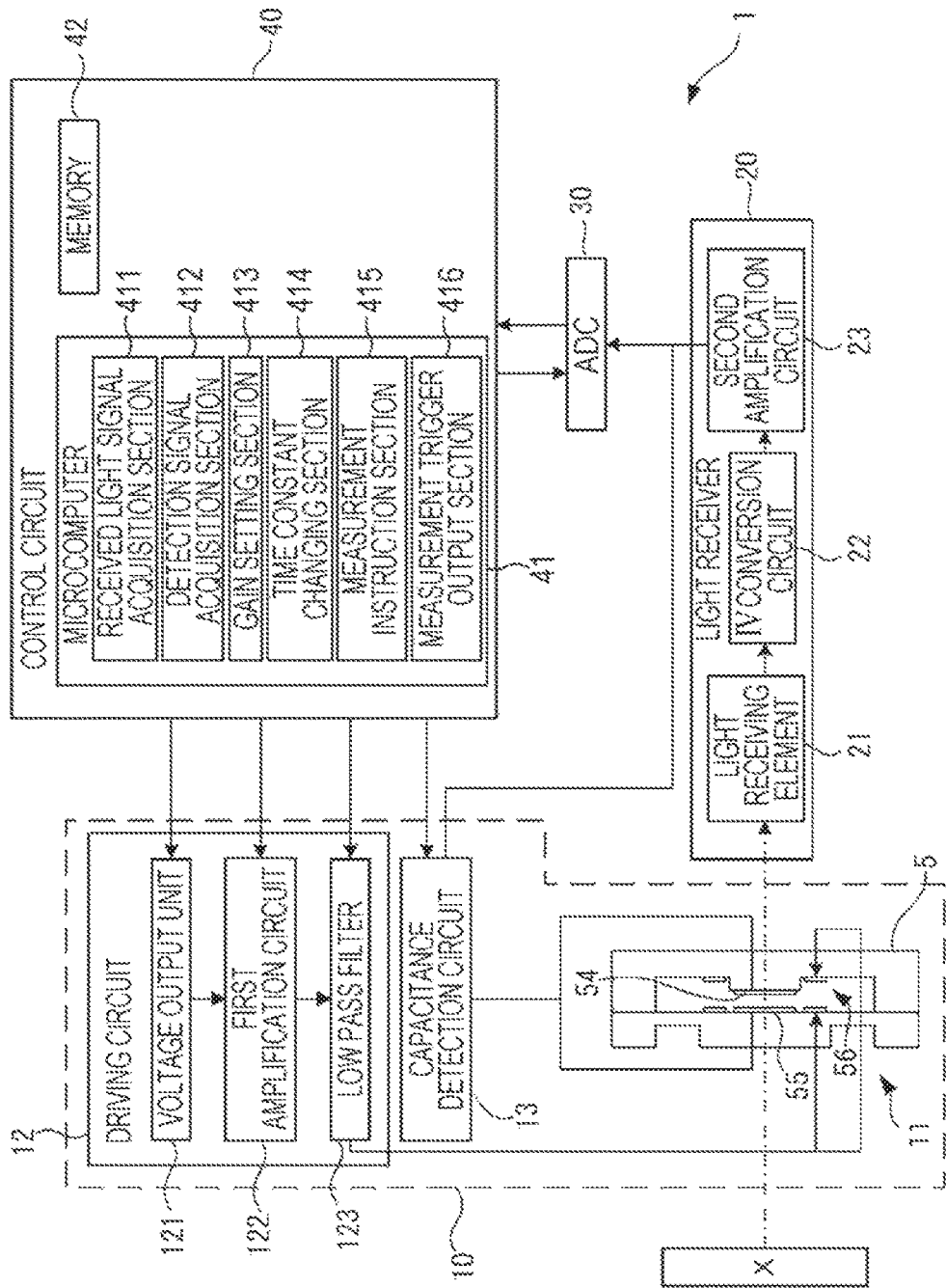
FIG. 1 is a block diagram that illustrates the schematic configuration of a spectroscopic measurement apparatus according to a first embodiment.

A spectroscopic measurement apparatus according to a first embodiment of the invention will now be explained.
Configuration of Spectroscopic Measurement Apparatus FIG. 1 is a block diagram that illustrates the schematic configuration of a spectroscopic measurement apparatus according to an exemplary embodiment of the invention. A spectroscopic measurement apparatus 1 is an apparatus that analyzes the optical intensity of each wavelength of incident light coming in from a measurement target X and measures its spectrum. As illustrated in FIG. 1, the spectroscopic measurement apparatus 1 includes an optical module 10, a light receiver 20, an ADC 30, and a control circuit 40. The optical module 10 includes an optical filter device 11, a driving circuit 12, and a capacitance detection circuit 13.

Figure 2:
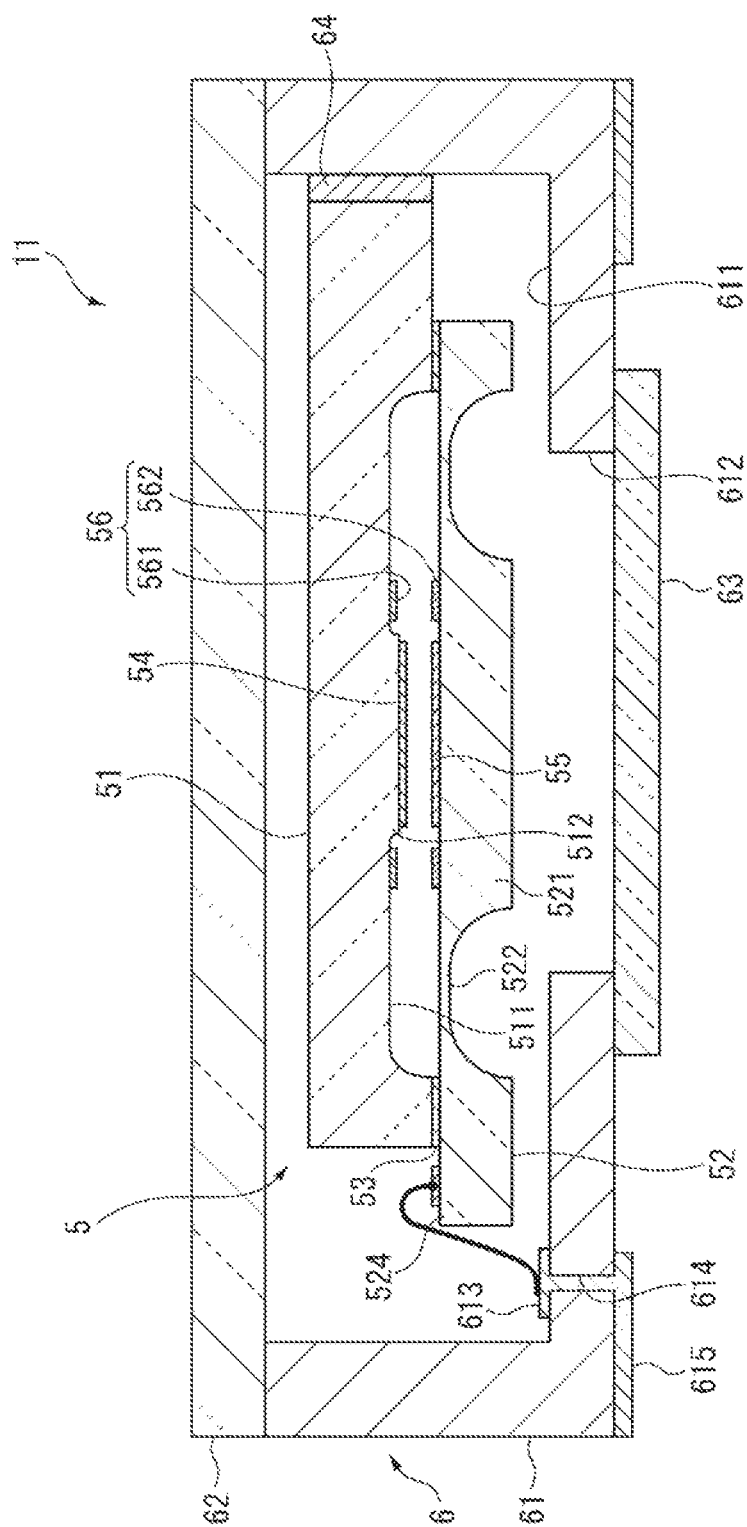
FIG. 2 is a sectional view of the schematic structure of an optical filter device according to the first embodiment.

The optical module 10 may further include a light source unit that applies illuminating light to the measurement target X.
Structure of Optical Filter Device FIG. 2 is a sectional view of the schematic structure of an optical filter device 11. The optical filter device 11 includes a housing 6. The optical filter device 11 further includes a wavelength variable interference filter 5 (spectroscopic element), which is housed inside the housing 6. As illustrated in FIG. 2, the wavelength variable interference filter 5 includes a fixed substrate 51 and a movable substrate 52. The fixed substrate 51 and the movable substrate 52 are made of, for example, various kinds of glass, quartz, or the like. The fixed substrate 51 and the movable substrate 52 are formed as a single integrated substrate body by being joined to each other by means of a junctional membrane 53. As illustrated in FIG. 2, a fixed reflection film 54 (first reflection film) and a fixed electrode 561 (first electrode) are provided on the fixed substrate 51. The fixed electrode 561 is a constituent of an electrostatic actuator 56. A movable reflection film 55 (second reflection film) and a movable electrode 562 (second electrode) are provided on the movable substrate 52. The movable reflection film 55 and the fixed reflection film 54 face each other with a gap therebetween. The movable electrode 562 and the fixed electrode 561 face each other with a gap therebetween. The movable electrode 562 and the fixed electrode 561 constitute the electrostatic actuator 56. One edge region of the movable substrate 52 includes an electric mount region 524. The electric mount region 524 is a protruding region located outside the corresponding edge of the fixed substrate 51. An electrode terminal portion (not illustrated) that is connected to the fixed reflection film 54, the movable reflection film 55, the fixed electrode 561, and the movable electrode 562 is provided on the electric mount region 524.
Structure of Fixed Substrate The fixed substrate 51 has a first groove 511 and a second groove 512, which are formed using an etching method. The second groove 512 is shallower than the first groove 511. In a plan view taken in the thickness direction of the fixed substrate 51, the first groove 511 is a ring-shaped groove the center of which coincides with the center of the fixed substrate 51. The second groove 512 is formed as a center region that is encircled by the first groove 511 in the plan view and is raised toward the movable substrate 52. The fixed electrode 561 is provided on the surface of the first groove 511. The fixed reflection film 54 is provided on the raised surface, that is, the surface of the second groove 512.

The fixed electrode 561 is made of an electrode material that has electrical conductivity. For example, it is possible to use Pt, Ir, Au, Al, Cu, Ti, ITO, IGO, etc. or conductive polymer as the electrode material. The fixed electrode 561 has, for example, a ring-like shape that substantially encloses the region of the second groove. A wiring electrode (not illustrated) that is wired to the electric mount region 524 is connected to the fixed electrode 561.

The fixed reflection film 54 is a conductive reflection film made of, for example, a metal film such as Ag or Ag alloy, a conductive alloy film, etc. The fixed reflection film 54 functions also as a capacitance detection electrode for detecting electrostatic capacitance in accordance with a "between-reflection-films" distance (distance between the fixed reflection film 54 and the movable reflection film 55). A dielectric multilayer film that has a stack structure made up of high refractive layers and low refractive layers may be used as the fixed reflection film 54. In such a case, it is possible to ensure that the fixed reflection film 54 functions as a capacitance detection electrode by, for example, forming a conductive metal alloy film as the bottom layer or the top layer of the dielectric multilayer film. A wiring electrode that is not illustrated is connected to the fixed reflection film 54. The wiring electrode is wired to the electric mount region 524 of the movable substrate 52.

Structure of Movable Substrate

The movable substrate 52 includes a movable region 521, which is formed at the center of the movable substrate in a plan view, and a supporting region 522, which supports the movable region 521 in such a way as to allow the movable region 521 to move forward and backward in the substrate thickness direction. The thickness of the movable region 521 is greater than that of the supporting region 522. In a filter plan view, the movable region 521 has, at least, a diameter that is greater than the rim-to-rim diameter of the raised surface region of the second groove 512. The movable reflection film 55 and the movable electrode 562 are provided on the movable region 521.

The movable electrode 562 is provided at the opposite position of the fixed electrode 561 in a facing manner. The movable electrode 562 and the fixed electrode 561 constitute the electrostatic actuator 56. The movable electrode 562 is made of an electrode material similarly to the fixed electrode 561. The movable electrode 562 has, for example, a ring-like shape that substantially encloses the movable reflection film 55. A wiring electrode (not illustrated) that is wired to the electric mount region 524 is connected to the movable electrode 562.

The movable reflection film 55 and the fixed reflection film 54 face each other with an air gap therebetween. The movable reflection film 55 is provided at the center of the movable region 521 on the surface facing the fixed substrate 51 in such a way as to face the fixed reflection film 54 with a gap therebetween. A reflection film of the same composition as that of the fixed reflection film 54 described earlier is used as the movable reflection film 55. A wiring electrode that is not illustrated is connected to the movable reflection film 55. The wiring electrode is wired to the electric mount region 524 of the movable substrate 52.

The supporting region 522 is a diaphragm with which the movable region 521 is surrounded. The thickness of the supporting region 522 is less than that of the movable region 521. Therefore, the supporting region 522 is easier to yield to a deforming force than the movable region 521 is. This makes it possible to, even with weak electrostatic attraction, give rise to the displacement of the movable region 521 toward the fixed substrate 51. Since the thickness of the movable region 521 is greater than that of the supporting region 522, the rigidity of the movable region 521 is also greater than that of the supporting region 522. Therefore, even when the supporting region 522 is pulled toward the fixed substrate 51 due to electrostatic attraction, the shape of the movable region 521 is less susceptible to change. Though a case where the supporting region 522 is a diaphragm is taken as an example in the present embodiment, the scope of the invention is not limited thereto. For example, beams radiating from the filter center axis at equiangular pitch may constitute the supporting region.

Structure of Housing

As illustrated in FIG. 2, the housing 6 includes a base 61 and a glass substrate 62. For the bonding of the base 61 and the glass substrate 62, for example, low-melting-point glass bonding using glass frit (low-melting-point glass) or epoxy resin bonding, etc. can be used. As a result of the bonding, an accommodation space is formed inside the housing 6. The wavelength variable interference filter 5 is housed in the accommodation space. The accommodation space inside the housing 6 is kept at a reduced pressure that is lower than atmospheric pressure (for example, in a vacuum state).

The base 61 has, for example, a stack structure made up of thin layered ceramic plates. The base 61 has a concave portion 611, inside which the wavelength variable interference filter 5 is to be housed. The wavelength variable interference filter 5 is fixed to, for example, a side of the concave portion 611 of the base 6. There is a light passing hole 612 in the bottom of the concave portion 611 of the base 6. The light passing hole 612 includes an area overlapping with the reflection films 54 and 55 of the wavelength variable interference filter 5. The glass substrate 62 is bonded to one surface of the base 61, and a cover glass 63, by which the light passing hole 612 is covered, is bonded to the opposite surface of the base 61.

An internal terminal portion 613 corresponding to each wiring electrode of the wavelength variable interference filter 5 is provided on the base 61. The internal terminal portion 613 is connected via a conduction hole 614 to an external terminal portion 615, which is provided outside the base 61. The external terminal portion 615 is connected to the driving circuit 12 and the capacitance detection circuit 13. Specifically, the external terminal portion 615 connected electrically to the fixed electrode 561 and the movable electrode 562 is connected to the driving circuit 12, and the external terminal portion 615 connected electrically to the fixed reflection film 54 and the movable reflection film 55 is connected to the capacitance detection circuit 13.

Configuration of Driving Circuit

The driving circuit 12 is an example of a driving control section according to an aspect of the invention. As illustrated in FIG. 1, the driving circuit 12 includes a voltage output unit 121, a first amplification circuit 122, and a low pass filter 123. The voltage output unit 121 is an example of a voltage output section according to an aspect of the invention. On the basis of a control signal supplied from the control circuit 40, the voltage output unit 121 outputs a pulse voltage that has a rectangular waveform to the first amplification circuit 122. In addition, on the basis of a control signal supplied from the control circuit 40, the voltage output unit 121 changes the cycle T of a pulse voltage outputted therefrom. Though a pulse voltage is outputted from the voltage output unit 121 in the example described in the present embodiment, the pulse voltage may be outputted from the control circuit 40 to the voltage output unit 121.

The first amplification circuit 122 amplifies the inputted pulse voltage. The first amplification circuit 122 is an inverting or non-inverting amplification circuit using an operational amplifier and is configured as a programmable gain amplifier in which a digital potentiometer, etc. is used for its feedback resistance. On the basis of a control signal supplied from the control circuit 40, the first amplification circuit 122 controls the digital potentiometer to change the gain. By this means, the first amplification circuit 122 changes the wavelength region of transmitted light going out of the wavelength variable interference filter 5 (measurement wavelength region).

The rectangular pulse voltage outputted from the first amplification circuit 122 is inputted into the low pass filter 123. The low pass filter 123 processes the input and outputs a first-order-lag driving voltage to the electrostatic actuator 56 of the wavelength variable interference filter 5. The low pass filter 123 includes an operational amplifier, a resistor, and a capacitor. The resistance value of the resistor is variable by means of a digital potentiometer. This makes it possible to change the time constant τ of the low pass filter 123. On the basis of a control signal supplied from the control circuit 40, the low pass filter 123 controls the digital potentiometer to change the time constant τ.

Configuration of Capacitance Detection Circuit

The capacitance detection circuit 13 is an example of a distance detection section according to an aspect of the invention. The capacitance detection circuit 13 is connected to the fixed reflection film 54 and the movable reflection film 55 of the wavelength variable interference filter and is configured as, for example, a switched-capacitor-type circuit. The capacitance detection circuit detects electrostatic capacitance between the fixed reflection film 54 and the movable reflection film 55 and outputs a detection signal. Let C be electrostatic capacitance. Let d be between-reflection-films distance. Let S be area size of the fixed reflection film 54 and the movable reflection film 55. Let ε be dielectric constant between the reflection films. Given these definitions, a relation of $C\varepsilon S/d$ holds true. Therefore, the control circuit 40 is capable of calculating the between-reflection-films distance d on the basis of a detection signal.

Configuration of Light Receiver

As illustrated in FIG. 1, the light receiver 20 includes a light receiving element 21 (light receiving unit), an IV conversion circuit 22, and a second amplification circuit 23, etc. The light receiving element 21 is a photoelectric conversion element such as a photodiode. The light receiving element 21 receives transmitted light from the wavelength variable interference filter 5 and outputs a received light signal (current or charge signal) corresponding to the amount of received light. The IV conversion circuit 22 changes the received light signal inputted from the light receiving element 21 into a voltage signal. Specifically, the IV conversion circuit 22 is made up of an operational amplifier, a resistor, and a capacitor. As the feedback resistance of the operational amplifier, preferably, resistance that is as small as possible (a predetermined resistance value or less) should be used. This ensures a high S/N ratio and stable driving and makes it possible to perform spectroscopic measurement at a high speed. The second amplification circuit 23 is an inverting amplification circuit or a non-inverting amplification circuit using an operational amplifier. The second amplification circuit 23 amplifies the received light signal outputted from the IV conversion circuit 22.

Configuration of ADC

The ADC (analog-to-digital converter) 30 receives a detection signal input from the capacitance detection circuit 13 and a received light signal input from the light receiver 20. That is, the ADC 30 has 2-ch (channels) ports that are a received light signal input port and a detection signal input port. In a modified structure, for example, a multiplexer, etc. may be provided upstream of the ADC 30, a received light signal and a detection signal may be inputted into the multiplexer, and either the received light signal or the detection signal may be outputted to the ADC 30 by switching control. The ADC 30 converts the detection signal or the received light signal from an analog signal format into a digital signal format and outputs the conversion result to the control circuit 40. In the present embodiment, an external converter provided outside the control circuit 40 is taken as an example of the ADC 30. However, the ADC 30 may be built in the control circuit 40. The ADC 30 of the present embodiment performs conversion processing by means of its hardware configuration on the basis of a measurement trigger signal supplied from the control circuit 40. As compared with software processing, which takes longer for loading and executing various functions, hardware processing realizes a higher processing speed and a reduction in measurement wavelength interval.

Configuration of Control Circuit

The control circuit 40 includes a microcomputer (micro controller) 41 and a memory 42. The memory 42 is a storage element such as a flash memory and may be built in the microcomputer. For example, capacitance table data and voltage table data are stored in the memory.

The capacitance table data is table data showing a relationship between the electrostatic capacitance between the fixed reflection film 54 and the movable reflection film and the between-reflection-films distance (or the wavelength λ of transmitted light from the wavelength variable interference filter 5).

The voltage table data is table data storing the voltage level of a driving voltage applied to the electrostatic actuator 56 (or the gain set at the first amplification circuit 122) in relation to the measurement wavelength region. That is, in the present embodiment, the gain of the first amplification circuit 122 is increased or decreased to increase or decrease the voltage level of a pulse voltage outputted from the voltage output unit 121, thereby changing the measurement wavelength region (the sweep distance of the movable region 521). The maximum wavelength in the measurement wavelength region corresponds to the between-reflection-films distance in a state in which no voltage is applied to the electrostatic actuator 56. On the other hand, it is possible to change the minimum wavelength in the measurement wavelength region by the voltage level of a pulse voltage. Therefore, the voltage level of a pulse voltage for the minimum wavelength in the measurement wavelength region (or the gain set at the first amplification circuit 122) is recorded in the voltage table data. The capacitance table data and the voltage table data may be integrated into a single piece of data.

The microcomputer 41 functions as a received light signal acquisition section 411, a detection signal acquisition section 412, a gain setting section 413 (level changing section), a time constant changing section 414, a measurement instruction section 415, and a measurement trigger output section 416, etc. by running programs stored in the memory 42.

The received light signal acquisition section 411 acquires a received light signal by controlling the light receiver 20 and the ADC 30. The detection signal acquisition section 412 acquires a detection signal by controlling the capacitance detection circuit 13 and the ADC 30. The gain setting section 413 outputs a control signal corresponding to the measurement wavelength region to the first amplification circuit 122 to set the gain of the first amplification circuit 122. The time constant changing section 414 judges whether the amount of change in the between-reflection-films distance (distance change velocity) is uniform in velocity or not on the basis of a detection signal. If not uniform in velocity, the time constant changing section 414 changes the time constant τ of the low pass filter 123.

The measurement instruction section 415 outputs a control signal to the voltage output unit 121 to cause it to output a pulse voltage of the cycle T. The measurement instruction section 415 generates a measurement start timing signal that is in sync with the cycle T of the pulse voltage. The measurement trigger output section 416 generates a measurement trigger signal of a constant cycle to the ADC 30. The ADC 30 performs AD conversion processing at the input timing of the measurement trigger signal and outputs a received light signal and a detection signal to the control circuit 40 in a constant cycle.

In addition to those described above, the microcomputer 41 may include a data updating section that updates the voltage table data. The data updating section judges whether the between-reflection-films distance calculated on the basis of the maximum value of a detection signal is equal to a distance corresponding to the minimum wavelength of the measurement wavelength region or not. If the between-reflection-films distance corresponding to the maximum value of the detection signal is not equal to the distance corresponding to the minimum wavelength of the measurement wavelength region, the data updating section updates the voltage table data. For example, on the basis of the difference value between the between-reflection-films distance calculated from the maximum value of the detection signal and the between-reflection-films distance corresponding to the minimum wavelength of the target measurement wavelength region, the correction value of the voltage level of the driving voltage applied to the electrostatic actuator 56 (the correction value of the gain increased/decreased by the gain setting section 413) is calculated, and the voltage table data is updated.

Spectroscopic Measurement Method

Figure 3:
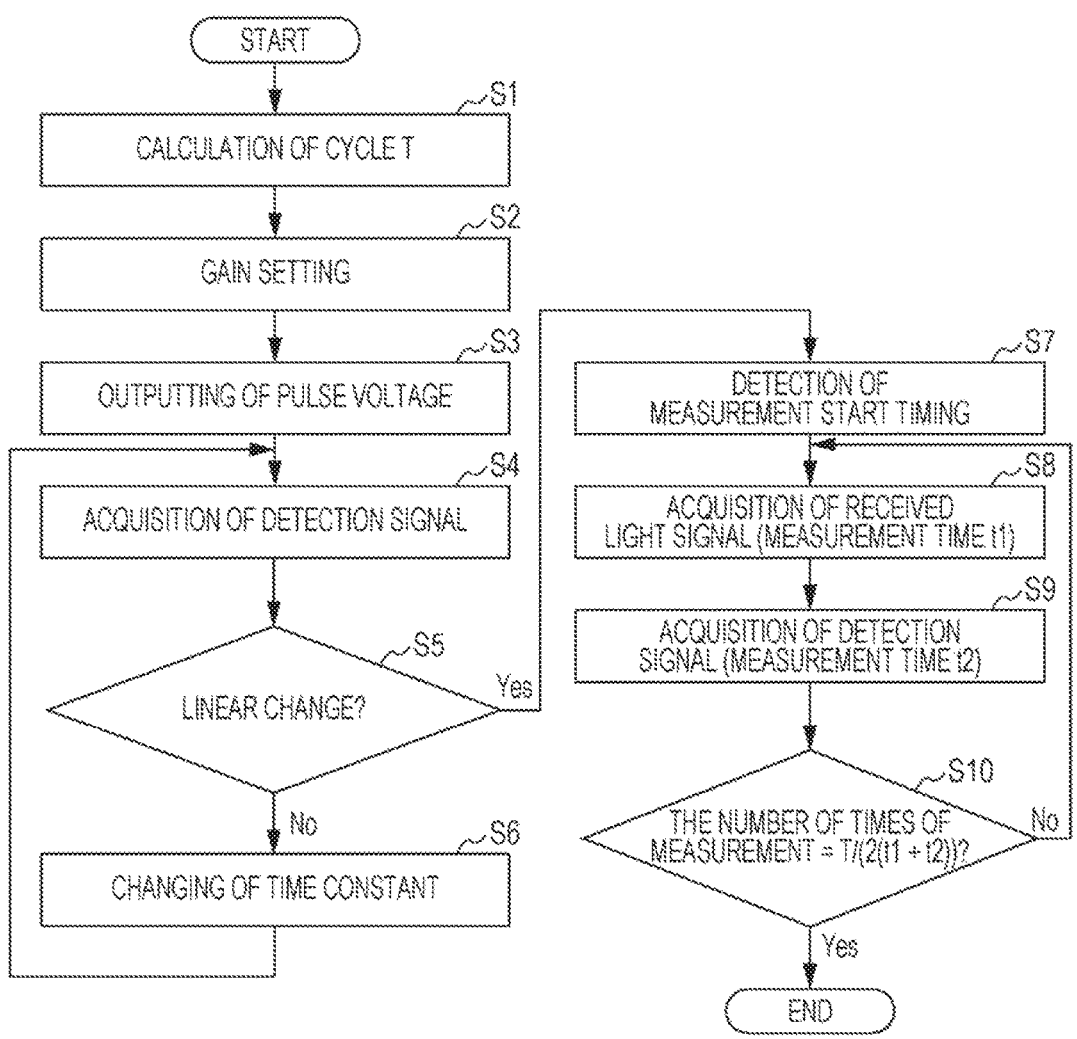
FIG. 3 is a flowchart that illustrates a spectroscopic measurement method according to the first embodiment.
Figure 4:
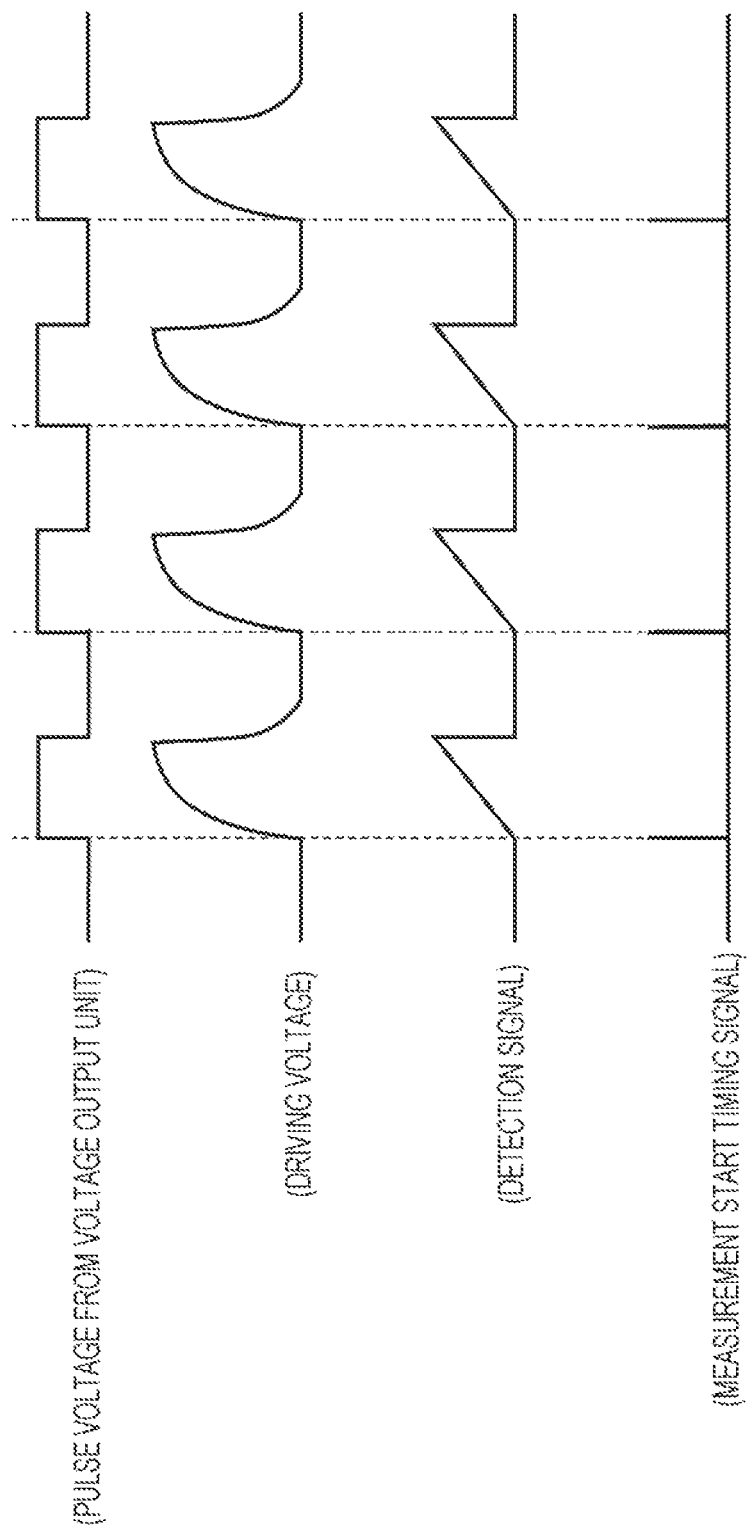
FIG. 4 is a timing chart of, in spectroscopic measurement processing according to the first embodiment, a pulse voltage outputted from a voltage output unit, a driving voltage applied to an electrostatic actuator, a detection signal outputted from a capacitance detection circuit, and a measurement start timing signal.

Next, with reference to the accompanying drawings, a spectroscopic measurement method implemented by the spectroscopic measurement apparatus 1 described above will now be explained. FIG. 3 is a flowchart that illustrates a spectroscopic measurement method according to the present embodiment. FIG. 4 is a timing chart of, in spectroscopic measurement processing, a pulse voltage outputted from the voltage output unit 121, a driving voltage applied to the electrostatic actuator 56, a detection signal outputted from the capacitance detection circuit 13, and a measurement start timing signal.

A signal for requesting spectroscopic measurement for a predetermined measurement wavelength region is inputted from an external apparatus, for example, from a personal computer, to the control circuit 40. Upon receipt of this request signal, the spectroscopic measurement apparatus 1 of the present embodiment initiates spectroscopic measurement processing. In the spectroscopic measurement processing, first, the measurement instruction section 415 calculates the cycle T of a pulse voltage corresponding to the measurement wavelength region included in the request signal as illustrated in FIG. 3 (step S1). When the spectroscopic measurement apparatus 1 acquires a received light signal and a detection signal, it is necessary to take, into consideration, response time at each circuit (the driving circuit 12, the capacitance detection circuit 13, the IV conversion circuit 22, the second amplification circuit 23, etc.) and the time taken for AD conversion processing by the ADC 30. If the time taken for acquisition of a received light signal is defined as measurement time t1 and if the time taken for acquisition of a detection signal is defined as measurement time t2, the time taken for performing measurement once (the time taken for acquisition of one received light signal and one detection signal) is expressed as t1+t2. Let Λ be the bandwidth of the measurement wavelength region. For measurement for light of each wavelength with a measurement wavelength interval "a", it is necessary to perform measurement N times, where N=Λ/a. Therefore, the measurement instruction section 415 calculates T=2N (t1+t2) as the cycle T of a pulse voltage for minimizing the measurement time. The measurement wavelength interval "a" may be either a preset value or a value included in the request signal. To be exact, response time at each circuit of the light receiver 20 is different from response time at the capacitance detection circuit 13. However, the difference therebetween is sufficiently small as compared with the time taken for AD conversion processing. Therefore, it is OK to calculate the cycle T by considering that an equation of t1=t2 holds.

Next, the gain setting section 413 reads the voltage level of a pulse voltage corresponding to the measurement wavelength region (gain at the first amplification circuit 122) out of the voltage table data, and outputs, to the first amplification circuit 122, a control signal for setting this voltage level (gain). The control signal is inputted into the digital potentiometer of the first amplification circuit 122, and the gain of the first amplification circuit 122 is set into a gain value corresponding to the control signal (step S2).

After that, the measurement instruction section 415 outputs a control signal to the voltage output unit 121 to cause it to output a pulse voltage of the cycle T set in the step S1 (step S3). In addition, the measurement instruction section 415 generates a measurement start timing signal that is in sync with the rise timing of a pulse voltage that has a rectangular waveform as illustrated in FIG. 4.

The pulse voltage outputted from the voltage output unit 121 in the step S3 is amplified at the first amplification circuit 122 by means of the gain set in the step S2. The amplification result is inputted into the low pass filter 123. The low pass filter 123 converts the inputted pulse voltage, which has a rectangular waveform as illustrated in FIG. 4, into a driving voltage that has a first-order-lag waveform. Then, the low pass filter 123 outputs the conversion result to the electrostatic actuator 56 of the wavelength variable interference filter 5. As a result, the between-reflection-films distance in the wavelength variable interference filter 5 varies at the distance change velocity based on the driving voltage having the first-order-lag waveform.

Next, the detection signal acquisition section 412 acquires the detection signal outputted from the capacitance detection circuit 13 (step S4). In this step S4, the detection signal acquisition section 412 acquires the detection signal at the output timing of the measurement trigger signal generated by the measurement trigger output section 416. Specifically, the measurement trigger output section 416 generates a measurement trigger signal of a predetermined cycle (sampling cycle signal) that is shorter than the cycle of the measurement start timing signal, and outputs it to the ADC 30. The cycle of the measurement trigger signal is the time taken for performing measurement once, which is, as described above, t1+t2. Therefore, the detection signal acquisition section 412 acquires a detection signal in the sampling cycle t1+t2.

Next, the time constant changing section 414 judges whether the signal level of each detection signal acquired (between-reflection-films distance) changes linearly or not (step S5). That is, the time constant changing section 414 judges whether the between-reflection-films distance changes at a uniform velocity or not. In the step S5, the time constant changing section 414 calculates a regression model $f(x_i)$ by using sampling time $x_i$ and detection signal values $y_i$ by means of the least square method or the like. Then, the time constant changing section 414 calculates a coefficient of determination $R^2$ using the following formula, where $y_{av}$ denotes the average of the signal values $y_i$.

$$R^2 = 1 - \frac{\sum_{i=1}^{n}(y_i - f(x_i))^2}{\sum_{i=1}^{n}(y_i - y_{av})^2} \tag{1}$$

If the coefficient of determination $R^2$ is equal to or greater than a predetermined value (for example, 0.95), the time constant changing section 414 judges that the signal level changes linearly (Yes in the step S5). If the coefficient of determination $R^2$ is less than 0.95, the time constant changing section 414 judges that the signal level does not change linearly (No in the step S5).

If No in the step S5, the time constant changing section 414 outputs a control signal for changing the time constant τ to the low pass filter 123. The resistance value changes due to the input of the control signal into the digital potentiometer of the low pass filter 123, resulting in a change in the time constant τ of the low pass filter 123 (step S6).

Figure 5:
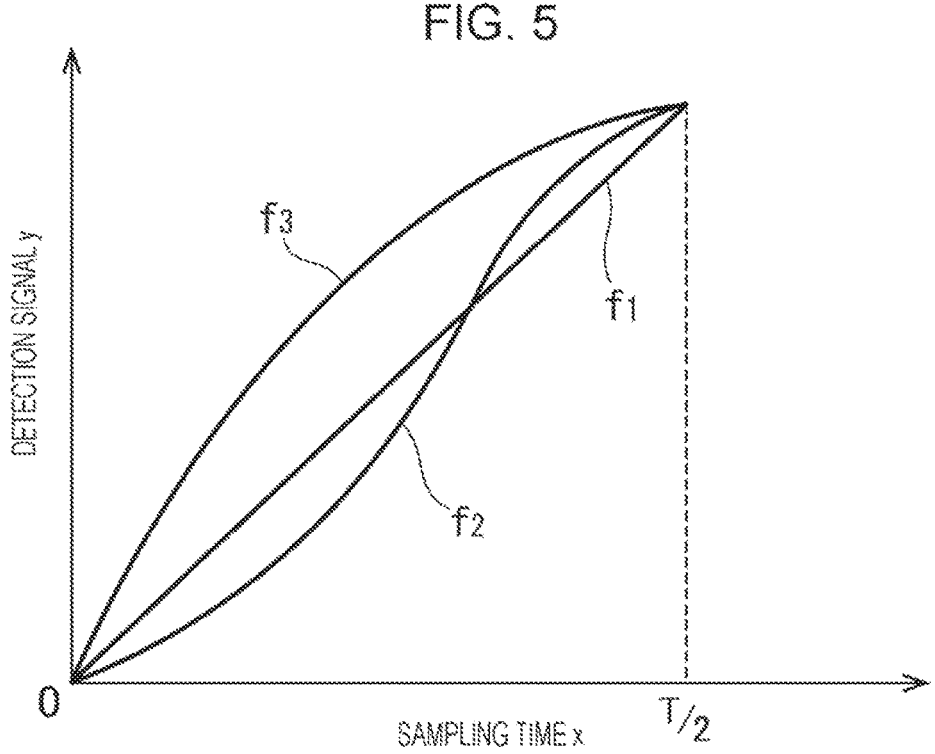
FIG. 5 is a graph that shows a change in a detection signal in relation to elapsed time.
Figure 6:
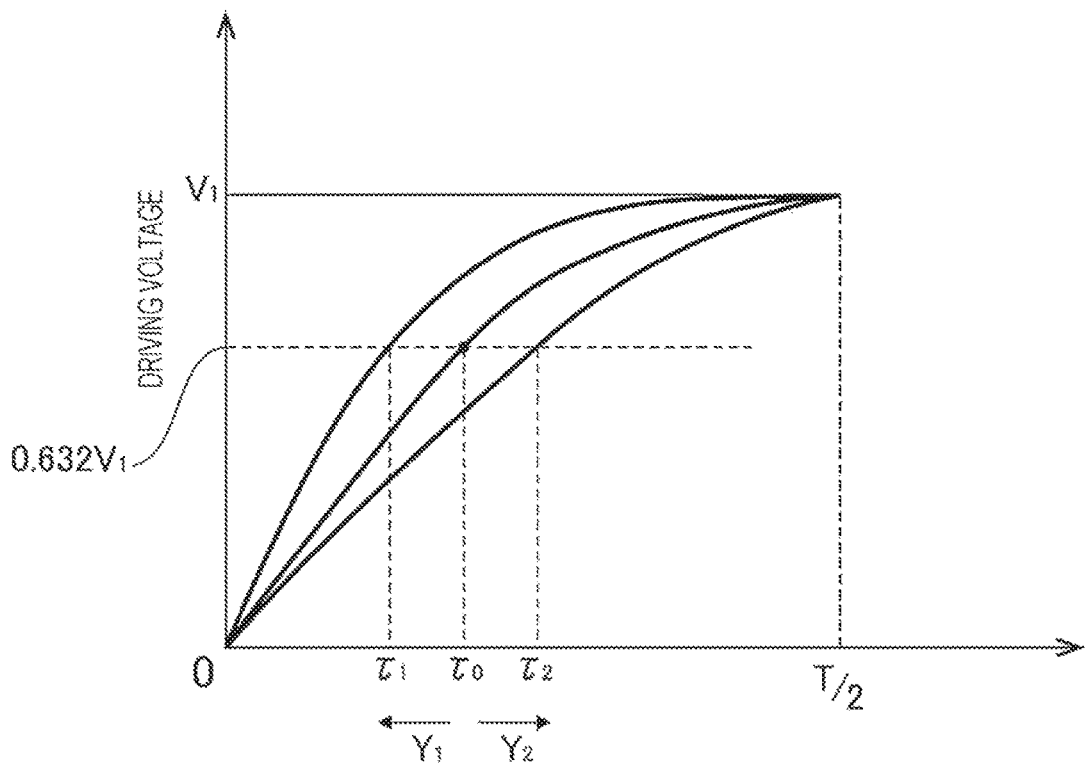
FIG. 6 is a graph for explaining the processing of changing a time constant by a time constant changing section.

FIG. 5 is a diagram that illustrates an example of a relationship between elapsed time (sampling time $x_i$) and the signal value $y_i$ of a detection signal. FIG. 6 is a diagram that illustrates the direction of a change in the time constant τ of the low pass filter 123. In FIG. 5, $f_1$ represents the approximation line of $(x_i, y_i)$, and $f_2$ and $f_3$ represent the approximation curves of $(x_i, y_i)$. The approximation line $f_1$ shows a state in which the between-reflection-films distance changes linearly, wherein the percentage of a change in a detection signal in relation to time is constant. In this case, it is judged as Yes in the step S5 and, therefore, the processing in the step S6 is not performed. The approximation curve $f_2$ shows a relationship between a detection signal and time in a case where the change in the driving voltage is initially small and becomes steep after the initial small change and, after the steep change, becomes gentle. In this case, in the step S6, the time constant changing section 414 changes the time constant τ into a time constant $τ_1$ that is less than the initial value $τ_0$ as indicated by an arrow $Y_1$ in FIG. 6. The approximation curve $f_3$ shows a relationship between a detection signal and time in a case where the change in the driving voltage is initially large and becomes gentle after the initial large change. In this case, in the step S6, the time constant changing section 414 changes the time constant τ into a time constant $τ_2$ that is greater than the initial value $τ_0$ as indicated by an arrow $Y_2$ in FIG. 6.

The process returns to the step S4 after the step S6. That is, detection signal acquisition is performed again, and it is judged whether the between-reflection-films distance changes linearly or not. The time constant τ is changed gradually by repeating the above processing, thereby setting a time constant with which the between-reflection-films distance changes linearly.

If Yes in the step S5, the received light signal acquisition section 411 detects a measurement start timing signal that is in sync with the cycle T of a pulse voltage (step S7) and acquires a received light signal in the sampling cycle (t1+t2) on the basis of the detection timing (step S8). Similarly, the detection signal acquisition section 412 acquires a detection signal in the sampling cycle (t1+t2) from the detection timing of the measurement start timing signal (step S9). That is, in the present embodiment, the acquisition timing of the received light signal from the light receiver 20 is the same as the acquisition timing of the detection signal from the capacitance detection circuit 13 (the detection timing of the between-reflection-films distance). On the basis of the detection timing of the measurement start timing signal, the received light signal and the detection signal in the sampling cycle (t1+t2) are inputted into the ADC 30. The ADC 30 performs AD conversion processing each time for one signal only. Therefore, when the received light signal and the detection signal are inputted, the signals are processed sequentially. It takes t1+t2 to complete AD conversion processing for both of the received light signal and the detection signal.

After that, the measurement instruction section 415 judges that the number of times of measurement (the number of times of received light signal (detection signal) acquisition) has reached T/(2(t1+t2)) or not (step S10). If No in the step S10, the process returns to the step S8 to continue received light signal acquisition and detection signal acquisition. If Yes in the step S10, the received light signal and the detection signal that are the results of spectroscopic measurement are outputted to external equipment (for example, to a personal computer) connected to the spectroscopic measurement apparatus 1, and signal acquisition processing ends.

Operational Effects of Present Embodiment

The spectroscopic measurement apparatus 1 of the present embodiment includes the fixed reflection film 54 and the movable reflection film 55, which face each other, and the electrostatic actuator 56, which changes the distance between the fixed reflection film 54 and the movable reflection film 55 (the between-reflection-films distance). The driving circuit 12 applies a voltage to the electrostatic actuator 56 in such a way that the between-reflection-films distance will change a uniform velocity. Therefore, the wavelength of light outputted from the wavelength variable interference filter 5 also changes linearly in relation to elapsed time, and, for this reason, it is possible to obtain the results of spectroscopic measurement for light of measurement wavelength with a constant measurement wavelength interval (with suppression of non-uniformity in measurement wavelength interval) by acquiring the received light signal outputted from the light receiver 20 in a constant cycle. Moreover, it is possible to obtain the results of spectroscopic measurement for each measurement wavelength with a constant wavelength interval by performing scan processing just once. It is not necessary to perform scan processing plural times and, therefore, it is possible to reduce the time taken for measurement.

In the present embodiment, the driving circuit 12 includes the voltage output unit 121, which outputs a pulse voltage, and the low pass filter 123, which converts a pulse voltage that has a rectangular waveform into a driving voltage that has a first-order-lag waveform and outputs it to the electrostatic actuator 56. Therefore, with a simple structure, it is possible to control the electrostatic actuator 56, the electrostatic attraction of which increases as the between-reflection-films distance decreases, so as to make the distance change velocity of the between-reflection-films distance uniform.

In the present embodiment, the low pass filter 123, which is capable of changing the time constant by changing the resistance value by means of the digital potentiometer, is used in the driving circuit 12, and the time constant changing section 414 outputs a control signal to the digital potentiometer of the low pass filter 123 for changing the time constant. By this means, it is possible to change the time constant of the low pass filter 123 so as to make the distance change velocity of the between-reflection-films distance uniform. Therefore, even in a case where the driving environment of the wavelength variable interference filter 5 changes, for example, even in a case where the voltage level of a pulse voltage changes, it is possible to perform spectroscopic measurement processing at a constant measurement wavelength interval.

In the present embodiment, the capacitance detection circuit 13 for detecting the between-reflection-films distance in the wavelength variable interference filter 5 (detecting electrostatic capacitance between the fixed reflection film 54 and the movable reflection film 55) is provided, and the time constant changing section 414 changes the time constant on the basis of the detection signal outputted from the capacitance detection circuit 13. By this means, it is possible to set the time constant of the low pass filter 123 optimally so as to make the distance change velocity of the between-reflection-films distance uniform.

In the present embodiment, the gain setting section 413 outputs a control signal to the first amplification circuit 122 for amplification of the pulse voltage outputted from the first amplification circuit 122, thereby increasing/decreasing the voltage level. By this means, it is possible to increase/decrease the voltage level (maximum value) of the driving voltage outputted from the low pass filter 123. By changing the maximum value of the voltage level of the driving voltage in this way, it is possible to set the range of changing the between-reflection-films distance by the electrostatic actuator 56 (the sweep distance of the movable region 521) into a range corresponding to the measurement wavelength region.

In the present embodiment, the received light signal acquisition section 411 acquires the received light signal outputted from the light receiver 20 in a constant cycle. In the present embodiment, since the between-reflection-films distance is changed at a uniform velocity as described above, it is possible to obtain the results of spectroscopic measurement for each measurement wavelength with a constant measurement wavelength interval by acquiring a received light signal in a constant cycle.

In the present embodiment, the detection signal acquisition section 412 acquires a detection signal in sync with the above-described acquisition of (in the same cycle as the acquisition cycle of) a received light signal. Therefore, on the basis of the detection signal, it is possible to acquire the between-reflection-films distance that is at the acquisition timing of the received light signal. By this means, even if the between-reflection-films distance is in a state of "substantially uniform in velocity", which is not "uniform in velocity" to be exact, it is possible to calculate the between-reflection-films distance that is at the acquisition timing of the received light signal on the basis of the detection signal. When this calculation is performed, it is possible to obtain the results of spectroscopic measurement with high precision by performing interpolation processing. Specifically, for example, in a case where the distance change velocity of the between-reflection-films distance changes cyclically (e.g., a change in a sinusoidal wave pattern), the measurement wavelength interval is sparse at a position of a high distance change velocity and is dense at a position of a low distance change velocity, resulting in low interpolation precision at a position of a sparse measurement wavelength interval. In contrast, in the present embodiment, it is possible to obtain measurement results in the neighborhood of the target measurement wavelength because of substantial uniformity in the distance change velocity. Therefore, the results of spectroscopic measurement do not fluctuate significantly due to interpolation processing, meaning that it is possible to obtain high-precision measurement results.

In the present embodiment, the measurement trigger output section 416 generates a measurement trigger signal at the time interval of (t1+t2), which is the sum of the measurement time t1 taken for acquisition of a received light signal and the measurement time t2 taken for acquisition of a detection signal. The received light signal and the detection signal are acquired in the sampling cycle t1+t2. Therefore, it is possible to start processing for acquiring the next signal at the point in time of completion of acquisition of each signal, thereby obtaining the results of spectroscopic measurement for each wavelength with a constant measurement wavelength interval speedily. Furthermore, because of simultaneous acquisition of a received light signal and a detection signal, it is possible to calculate the between-reflection-films distance that is at the acquisition timing of the received light signal. This realizes, for example, high-precision correction when the correction processing described above is performed separately.

Second Embodiment

Figure 7:
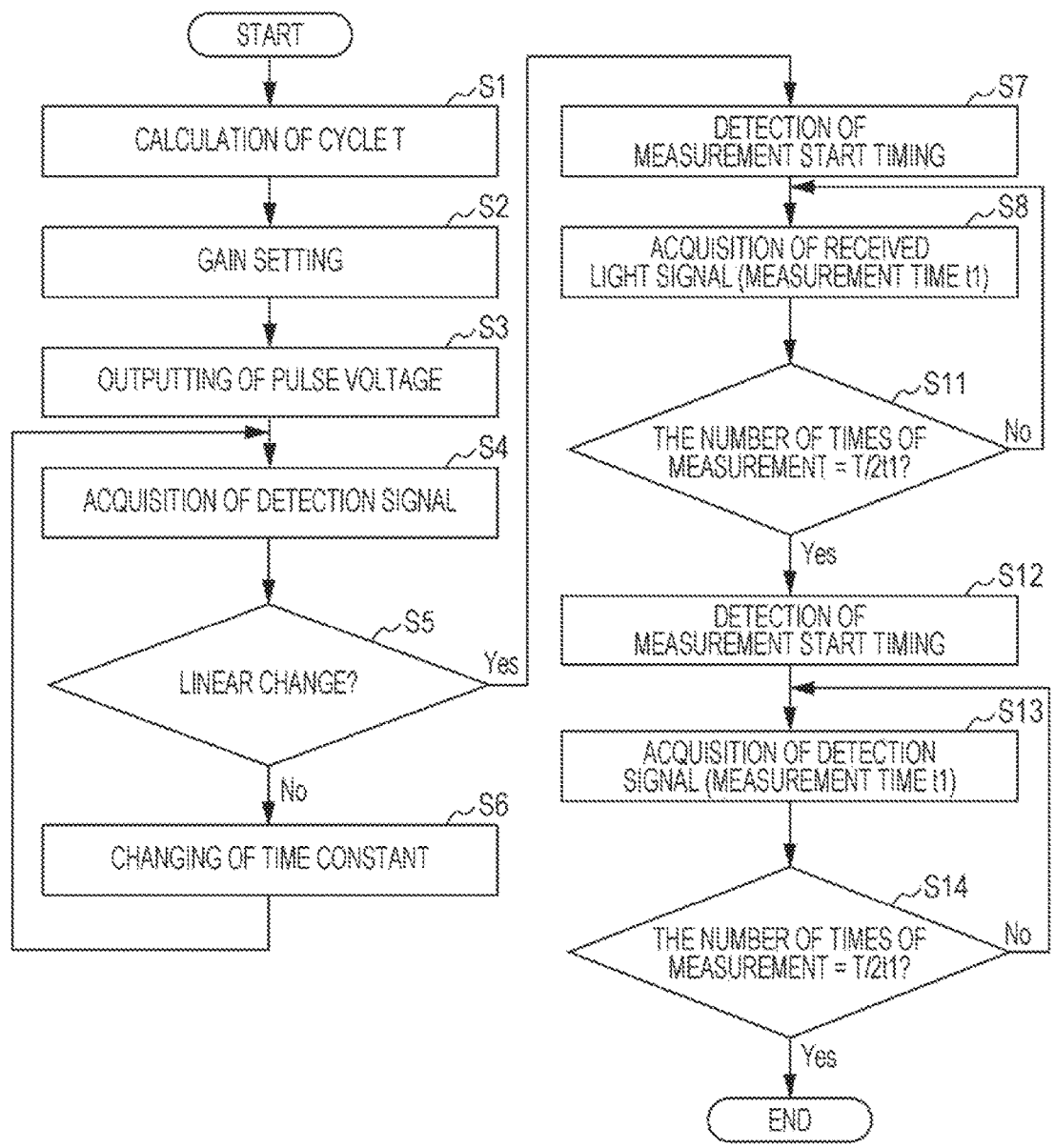
FIG. 7 is a flowchart that illustrates a spectroscopic measurement method in a spectroscopic measurement apparatus according to a second embodiment.

Next, a second embodiment of the present invention will now be explained. In the example of the first embodiment described above, a received light signal and a detection signal are acquired at the same time in the sampling cycle. The second embodiment is different from the first embodiment in that the acquisition timing of a received light signal and the acquisition timing of a detection signal are different from each other. A spectroscopic measurement apparatus 1 according to the second embodiment has the same structure as that of the first embodiment illustrated in FIGS. 1 and 2. Therefore, a detailed explanation of each component in the structure is omitted here. FIG. 7 is a flowchart that illustrates a spectroscopic measurement method in the spectroscopic measurement apparatus 1 of the second embodiment.

In the second embodiment, processing in steps S1 to S6 is performed similarly to that of the first embodiment as illustrated in FIG. 7. In the present embodiment, the cycle of the measurement trigger signal outputted from the measurement trigger output section 416 is set to be the measurement time t1 in the step S4. Therefore, the detection signal is acquired on the basis of the measurement time t1 in the step S4.

After the step S6, in the present embodiment, the acquisition of a received light signal only is performed first. Specifically, upon detection of measurement start timing in a step S7, the received light signal acquisition section 411 performs processing in a step S8 to acquire a received light signal in the sampling cycle t1. After that, the measurement instruction section 415 judges that the number of times of measurement has reached T/2t1 or not (step S11). If No in the step S11, the process returns to the step S8 to continue received light signal acquisition.

If Yes in the step S11, the acquisition of a detection signal only is performed. Specifically, the detection signal acquisition section 412 detects measurement start timing (step S12), and acquires a detection signal in the sampling cycle t1 from the point in time of the detection of the measurement start timing (step S13). After that, the measurement instruction section 415 judges that the number of times of measurement has reached T/2t1 or not (step S14). If No, the process returns to the step S13 to continue detection signal acquisition. If Yes, the results of spectroscopic measurement are outputted, and the spectroscopic processing ends.

Operational Effects of Present Embodiment

In the present embodiment, the acquisition of a received light signal by the received light signal acquisition section 411 and the acquisition of a detection signal by the detection signal acquisition section 412 are performed at different timing from each other. Therefore, it suffices to set, as the sampling cycle, the measurement time t1 taken for acquisition of a received light signal by the received light signal acquisition section 411. As compared with the first embodiment, it is possible to acquire a received light signal in a shorter sampling cycle. Therefore, for example, in a case where the between-reflection-films distance is changed at the same velocity as that of the first embodiment (a case where the cycle T of a pulse voltage is the same), in the second embodiment, it is possible to perform more measurements and to reduce the measurement wavelength interval. For example, assuming that the measurement time t1 is equal to the measurement time t2, it is possible to reduce the measurement wavelength interval to a half. This makes it possible to obtain the results of spectroscopic measurement with high resolution.

Third Embodiment

Next, a third embodiment of the present invention will now be explained. In the third embodiment, with reference to the accompanying drawings, an example of an electronic device in which the spectroscopic measurement apparatus 1 described above in the first and second embodiments is built will now be explained.

Schematic Structure of Printer

Figure 8:
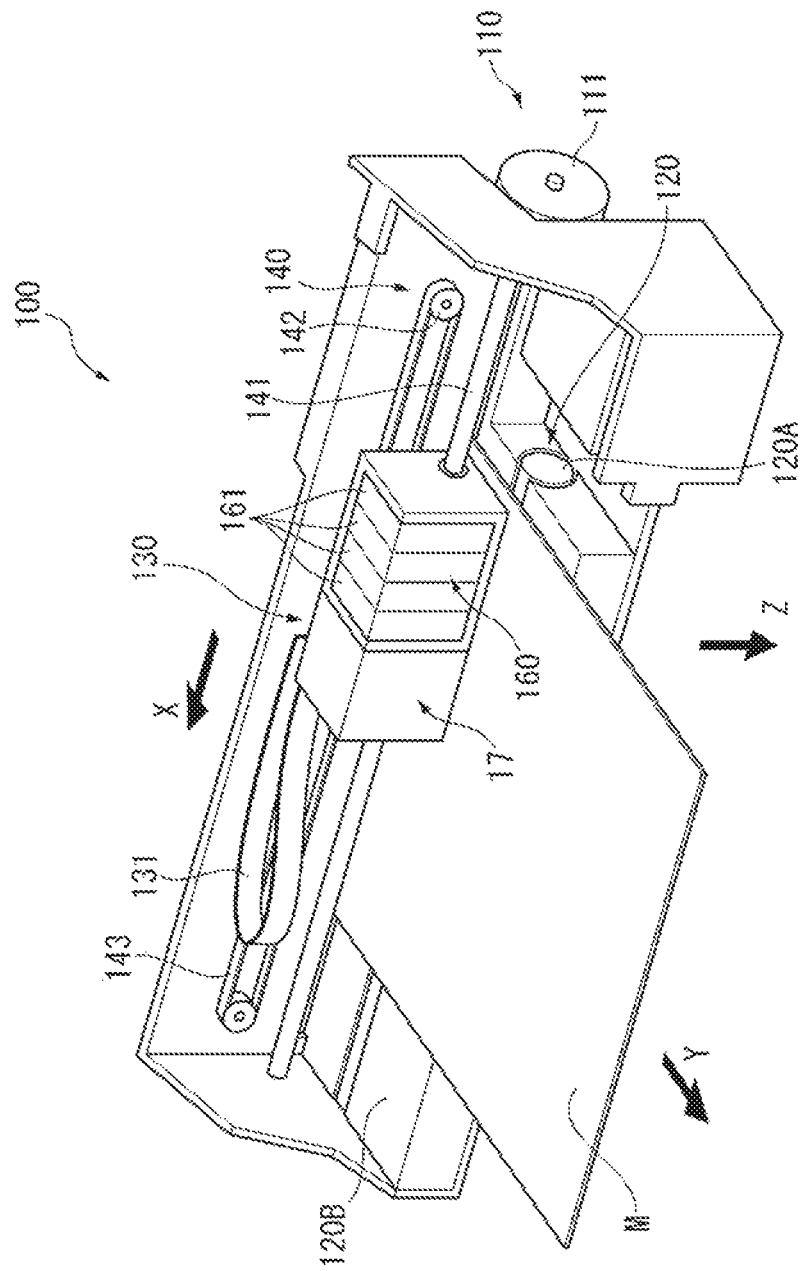
FIG. 8 is a schematic perspective view of the appearance of a printer according to a third embodiment.
Figure 9:
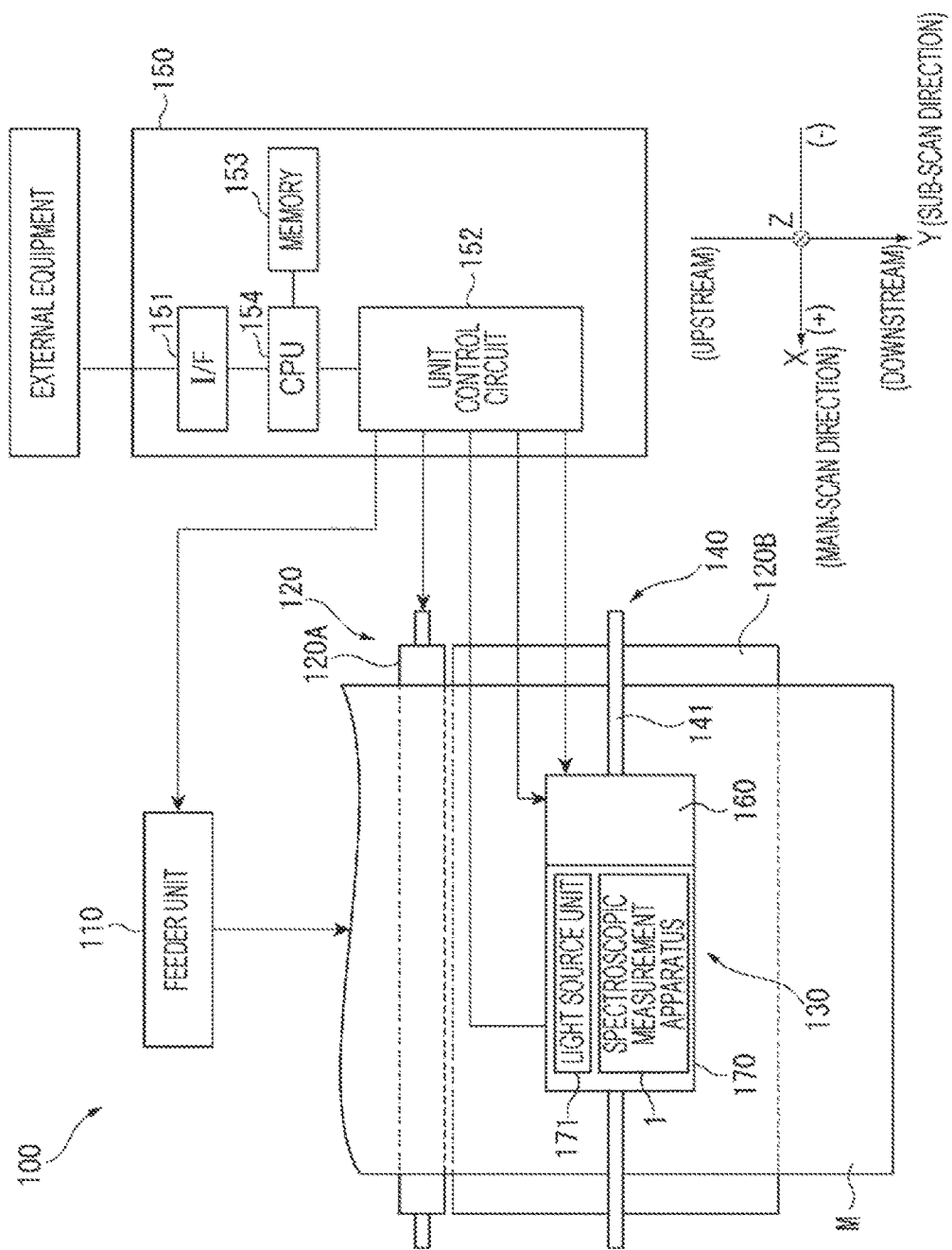
FIG. 9 is a block diagram that illustrates the schematic structure of the printer according to the third embodiment.

FIG. 8 is a schematic perspective view of the appearance of a printer 100 according to a third embodiment. FIG. 9 is a block diagram that illustrates the schematic structure of the printer 100 according to the third embodiment. As illustrated in FIG. 8, the printer 100 includes a feeder unit 110, a transportation unit 120, a carriage 130, a carriage movement unit 140, and a control unit 150 (refer to FIG. 9). On the basis of print data inputted from, for example, a personal computer, the printer 100 controls each of the units 110, 120, and 140 and the carriage 130 to print an image on a medium M. The printer 100 of the present embodiment forms a color patch, which is to be used for color measurement (colorimetry), at a predetermined position on the medium M on the basis of preset calibration print data, and performs spectroscopic measurement on the color patch. The printer 100 compares the actual measurement value of the color patch with the calibration print data to judge whether the color print contains any color misregistration or not. In a case where there is color misregistration, the printer 100 performs color correction on the basis of the actual measurement value. Each component of the printer 100 will now be explained in detail.

The feeder unit 110 is a unit that feeds the medium M to an image feeding position. The medium M is the target such as paper onto which an image is to be formed thereat. The feeder unit 110 includes, for example, a roll member 111 (refer to FIG. 8), which is a core for the medium M wound in the form of a roll thereon, a roll drive motor (not illustrated), and a roll drive gear train (not illustrated). On the basis of an instruction given from the control unit 150, the roll drive motor is driven to rotate. The force of rotation of the roll drive motor is transmitted to the roll member 111 via the roll drive gear train. Therefore, the roll member 111 rotates to unreel, and feed, the paper from the roll member 111 toward the downstream side (+Y) in the Y direction (sub-scan direction). In the example described in the present embodiment, the roll paper unreeled from the roll member 111 is fed. However, the scope of the invention is not limited to such an example. Any alternative feed method may be adopted to feed the medium M. For example, the medium M that is a stack of sheets on a tray, etc. may be fed by a roller, etc., one sheet after another.

The transportation unit 120 transports the medium M fed from the feeder unit 110 in the Y direction. The transportation unit 120 includes a transportation roller 120A, a driven roller (not illustrated), and a platen 120B. The driven roller is a follower roller that rotates by being driven by the transportation roller 120A. The driven roller is provided at a position where the medium M is to be nipped between the transportation roller 120A and the driven roller itself. The transportation roller 120A is configured to receive a driving force transmitted from a transportation motor that is not illustrated. When the transportation motor is driven under the control of the control unit 150, the transportation roller 120A is driven to rotate due to the force of motor rotation. The medium M is transported in the Y direction in a state of being pinched between the motor-driven roller 120A and the follower roller. The platen 120B facing the carriage 130 is provided downstream of the transportation roller 120A in the Y direction (at the +Y side).

The carriage 130 includes a print unit 160, which prints an image onto the medium M, and a spectroscope 170, which performs spectroscopic measurement at a predetermined measurement position on the medium M. The carriage 130 is configured to be able to move in the main-scan direction intersecting with the Y direction when driven by the carriage movement unit 140. The carriage 130 is connected via a flexible circuit 131 to the control unit 150. On the basis of an instruction given from the control unit 150, print processing by the print unit 160 and spectroscopic measurement processing by the spectroscope 170 are executed. A detailed structure of the carriage 130 will be described later.

The carriage movement unit 140 is an example of a movement mechanism according to the invention. On the basis of an instruction given from the control unit 150, the carriage movement unit 140 causes the carriage 130 to reciprocate in the X direction. The carriage movement unit 140 includes, for example, a carriage guide shaft 141, a carriage motor 142, and a timing belt 143. The carriage guide shaft 141 extends in the X direction. Both ends of the carriage guide shaft 141 are fixed to, for example, the housing of the printer 100. The carriage motor 142 drives the timing belt 143. The timing belt 143 is supported substantially in parallel with the carriage guide shaft 141. A part of the carriage 130 is fixed to the timing belt 143. The timing belt 143 travels in the normal direction and in the reverse direction when the carriage motor 142 is driven on the basis of an instruction given from the control unit 150. The carriage 130, which is fixed to the timing belt 143, reciprocates while being guided along the carriage guide shaft 141.

Next, with reference to the accompanying drawings, the structure of the print unit 160 and the spectroscope 170, which are mounted on the carriage 130, will now be explained.

Structure of Print Unit

The print unit 160 forms an image on the medium M by ejecting ink individually onto the medium M at a region where the print unit 160 and the medium M face each other. Plural ink cartridges 161 corresponding to ink of plural colors are detachably mounted on the print unit 160. Ink is supplied from each of the ink cartridges 161 through a tube (not illustrated) to an ink tank (not illustrated). The lower surface (facing the medium M) of the print unit 160 has nozzles (not illustrated), from which ink droplets are ejected. These nozzles correspond to the colors. For example, piezoelectric elements are arranged for these nozzles. As a result of the driving of the piezoelectric elements, ink supplied from the ink tank is ejected in the form of droplets to land onto the surface of the medium M. Dots are formed in this way.

Structure of Spectroscope

The spectroscope 170 includes an apparatus that is the same as or similar to the spectroscopic measurement apparatus 1 of the first and second embodiments, and further includes a light source unit 171. Illumination light is emitted by the light source unit 171 of the spectroscope 170 toward the medium M, and the spectroscopic measurement of light reflected at the medium M is performed by the spectroscopic measurement apparatus 1 of the spectroscope 170.

Configuration of Control Unit

The control unit 150 is an example of a control unit according to the invention. As illustrated in FIG. 9, the control unit 150 includes an I/F 151, a unit control circuit 152, a memory 153, and a CPU (Central Processing Unit) 154. The I/F 151 is an interface for print data inputted from external equipment such as, for example, a personal computer, into the CPU 154. The unit control circuit 152 includes a control circuit for controlling each of the feeder unit 110, the transportation unit 120, the print unit 160, the light source unit 171, the spectroscopic measurement apparatus 1, and the carriage movement unit 140. On the basis of an instruction signal supplied from the CPU 154, the unit control circuit 152 controls the operation of each unit. The control circuit for each unit may be provided separately from the control unit 150 and connected to the control unit 150.

Various programs and various kinds of data for controlling the operation of the printer 100 are stored in the memory 153. An example of various kinds of data mentioned above is print profile data that contains the ejection amount of each ink for color data included in print data.

The CPU 154 performs various kinds of control and processing by reading various programs out of the memory 153 and executing them. The control and processing performed by the CPU 154 includes, for example, drive control on the feeder unit 110, the transportation unit 120, and the carriage movement unit 140, print control on the print unit 160, giving a spectroscopic measurement instruction to the spectroscopic measurement apparatus 1, color measurement processing based on the results of spectroscopic measurement, and print profile data correction (updating), etc.

Operational Effects of Present Embodiment

In the printer 100 of the present embodiment, an apparatus that is the same as or similar to the spectroscopic measurement apparatus 1 of the first and second embodiments described earlier is mounted on the carriage 130. Therefore, when the reproduction property of a color image printed by the printer 100 in relation to original image data is measured, it is possible to perform spectroscopic measurement processing for each measurement wavelength with a constant measurement wavelength interval speedily by means of the spectroscopic measurement apparatus 1. Therefore, the control unit 150 is capable of speedily performing high-precision color measurement processing based on the results of spectroscopic measurement for each measurement wavelength with suppression of non-uniformity in measurement wavelength interval. Moreover, on the basis of the color measurement results, it is possible to perform print profile data update processing speedily with high precision.

Variation Examples

The scope of the invention is not limited to the foregoing embodiments. The scope of the invention encompasses various modifications and improvements, etc. introduced within a range in which the object of the invention is achievable.

For example, though the voltage level of a pulse voltage is able to be changed by the first amplification circuit 122 in the examples of the foregoing embodiments, the scope of the invention is not limited thereto. The first amplification circuit 122 may have a fixed gain, and the voltage level of a driving voltage may be fixed. In this case, a time constant with which the between-reflection-films distance changes at a uniform velocity may be preset as the time constant of the low pass filter 123. In addition, the capacitance detection circuit 13 may be omitted because it is possible to perform spectroscopic measurement processing for each measurement wavelength with a constant measurement wavelength interval regardless of the time constant of the low pass filter 123. However, if the capacitance detection circuit 13 is provided, when the between-reflection-films distance changes due to a change in the driving environment of the wavelength variable interference filter 5, for example, a change in vacuum conditions inside the housing 6, it is possible to detect the change in the driving environment of the wavelength variable interference filter 5. Moreover, since the time constant of the low pass filter 123 is changeable, even in a case where the driving environment of the wavelength variable interference filter 5 has changed, it is possible to set an optimum time constant so as to make the distance change velocity of the between-reflection-films distance uniform.

In the example of the first embodiment, the cycle T of a pulse voltage is set by using either a preset measurement wavelength interval "a" or a measurement wavelength interval "a" included in a request signal. Instead, the cycle T of a pulse voltage may have been set in advance. Also in this case, it is possible to perform spectroscopic measurement processing with a reduction in non-uniformity in measurement wavelength interval by acquiring a received light signal in a constant sampling cycle. However, if the sampling cycle for received signal acquisition is long, it follows that the measurement wavelength interval is wide. In this case, it is possible to reduce the measurement wavelength interval and perform spectroscopic measurement processing with high resolution by, for example, as in the second embodiment, acquiring a received light signal and acquiring a detection signal at different timing from each other and reducing the sampling cycle.

In the example of the second embodiment, the cycle T is set on the basis of the sum of the measurement time t1 and the measurement time t2 similarly to the first embodiment. In this case, as described earlier, it is possible to make the sampling cycle shorter. Accordingly, it is possible to reduce the measurement wavelength interval and perform spectroscopic measurement processing with high resolution. Alternatively, the cycle T of a pulse voltage may be set on the basis of the measurement time t1. In this case, though the change velocity of the between-reflection-films distance increases, it is possible to perform measurement at the same resolution as that of the first embodiment. Therefore, for example, in a case where the detection signal from the capacitance detection circuit 13 is not acquired (see the above variation example), it is possible to further reduce the time taken for spectroscopic measurement processing.

In the examples of the foregoing embodiments, the distance change velocity of the between-reflection-films distance is made uniform by changing the time constant of the low pass filter 123. However, it is difficult to make the distance change velocity perfectly uniform. Therefore, actually, the between-reflection-films distance changes at a substantially uniform velocity that is close to a uniform velocity. Therefore, the amount of received light for measurement wavelengths with a constant interval may be calculated by performing, for example, interpolation processing as described earlier from a combination of received light signals and detection signals obtained by performing spectroscopic measurement processing. Interpolation processing may be performed in a case where a difference value between each target measurement wavelength with a constant interval and an actual measurement wavelength corresponding to the between-reflection-films distance calculated on the basis of each detection signal is not less than a predetermined threshold value.

In the foregoing embodiments, a light-transmissive-type wavelength variable interference filter 5, which spectrally separates, from incident light that comes in, light of predetermined wavelengths, and allows the separated light to pass through itself, is described. However, the scope of the invention is not limited to such an example. For example, a light-reflective-type wavelength variable interference filter that spectrally separates, from incident light that comes in, light of predetermined wavelengths, and reflects the separated light may be used.

A specific structure for embodying the invention may be modified into other structure, etc. within a range in which the object of the invention is achievable.

The entire disclosure of Japanese Patent Application No. 2016-018307, filed Feb. 2, 2016 is expressly incorporated by reference herein.

What is claimed is:

1. A spectroscopic measurement apparatus, comprising:
   a wavelength variable interference filter including
      a first reflection film,
      a second reflection film that faces the first reflection film, and
      an electrostatic actuator that changes a distance between the first reflection film and the second reflection film; and
   a driving circuit that includes a low pass filter that is configured to receive a pulse voltage of a predetermined cycle and output a driving voltage that corresponds to the pulse voltage to drive the electrostatic actuator such that the distance between the first reflection film and the second reflection film changes at a uniform velocity.

2. The spectroscopic measurement apparatus according to claim 1, further comprising a control circuit in communication with the low pass filter, wherein a time constant of the low pass filter is variable, and the control circuit is configured to change the time constant.

3. The spectroscopic measurement apparatus according to claim 2, further comprising:
   a capacitance detection circuit that is configured to detect the distance between the first reflection film and the second reflection film, and
   wherein the control circuit is configured to change the time constant in such a way that a change in the distance detected by the capacitance detection circuit is uniform in velocity.

4. The spectroscopic measurement apparatus according to claim 1, further comprising:
   a control circuit that is configured to change a voltage level of the pulse voltage.

5. The spectroscopic measurement apparatus according to claim 1, further comprising:
   a light receiving element that is configured to receive light outputted from the wavelength variable interference filter,
   wherein a signal from the light receiving element is acquired in a constant cycle.

6. The spectroscopic measurement apparatus according to claim 5, wherein the driving circuit is configured to output a pulse voltage of a predetermined cycle and the low pass filter that outputs the driving voltage that corresponds to the pulse voltage for driving the electrostatic actuator, a time constant of the low pass filter being variable, further comprising:
   a capacitance detection circuit that is configured to detect the distance between the first reflection film and the second reflection film; and
   a control circuit that is configured to change the time constant in such a way that an amount of a change in the distance detected by the capacitance detection circuit is constant,
   wherein acquisition timing of the signal from the light receiving element and detection timing of the distance by the capacitance detection circuit are different from each other.

7. The spectroscopic measurement apparatus according to claim 1, wherein the pulse voltage of the predetermined cycle is a rectangular waveform, and the output voltage output by the low pass filter is a first-order-lag waveform corresponding to a time constant.

8. A driving circuit that drives an electrostatic actuator of a wavelength variable interference filter, the wavelength variable interference filter including a first reflection film, a second reflection film that faces the first reflection film, and the electrostatic actuator that changes a distance between the first reflection film and the second reflection film, comprising:
   a driving circuit that is configured to output a pulse voltage of a predetermined cycle,
   wherein the driving circuit includes a low pass filter that receives the pulse voltage of the predetermined cycle and outputs a driving voltage that corresponds to the pulse voltage for driving the electrostatic actuator such that the distance between the first reflection film and the second reflection film changes at a uniform velocity.

9. The driving circuit according to claim 8, wherein the pulse voltage of the predetermined cycle is a rectangular waveform, and the driving voltage output by the low pass filter is a first-order-lag waveform corresponding to a time constant.

10. A spectroscopic measurement method implemented by a spectroscopic measurement apparatus, the spectroscopic measurement apparatus including a wavelength variable interference filter and a light receiving element, the wavelength variable interference filter including a first reflection film, a second reflection film, and an electrostatic actuator, the second reflection film facing the first reflection film, the electrostatic actuator changing a distance between the first reflection film and the second reflection film, the light receiving element receiving light outputted from the wavelength variable interference filter, comprising:
   outputting a pulse voltage of a predetermined cycle to a low pass filter that outputs a driving voltage that corresponds to the pulse voltage for driving the electrostatic actuator such that a change in the distance between the first reflection film and the second reflection film is uniform in velocity; and
   acquiring a signal from the light receiving element in a constant cycle.

11. The spectroscopic measurement method according to claim 10, wherein the pulse voltage of the predetermined cycle is a rectangular waveform, and the driving voltage output by the low pass filter is a first-order-lag waveform corresponding to a time constant.

* * * * *